United States Patent

Goldshtein et al.

[15] 3,680,440
[45] Aug. 1, 1972

[54] METHOD OF MANUFACTURING STATOR CORE FRAME OF ELECTRICAL MACHINE, FOR EXAMPLE, TURBOGENERATOR, AND DEVICE FOR MACHINING SAID FRAME FOR REALIZATION OF SAID METHOD

[72] Inventors: Moisei Abramovich Goldshtein, ulitsa Tuklachevskogo 11, kv. 27; Arkady Moiseevich Goldshtein, ulitsa Tankopia, 29/I, kv. 12, both of Kharkov, U.S.S.R.

[22] Filed: Nov. 19, 1969

[21] Appl. No.: 878,051

[30] Foreign Application Priority Data
Nov. 22, 1968 U.S.S.R............................1284469
Nov. 22, 1968 U.S.S.R............................1284470

[52] U.S. Cl............................90/15, 90/90, 51/34 E
[51] Int. Cl. ..............................................B23p 23/00
[58] Field of Search......90/15, 15.1, 29, 90; 29/27 A, 29/26; 51/34 C–34 G, 241 S

[56] References Cited

UNITED STATES PATENTS

| | | |
|---|---|---|
| 3,513,517 | 5/1970 | Galbarini et al. ..................29/26 |
| 1,118,770 | 11/1914 | Higgins..........................90/29 X |
| 2,638,136 | 5/1953 | Miller............................90/15.15 |
| 3,286,324 | 11/1966 | Hautau ..........................90/15 X |
| 1,549,380 | 8/1925 | Praey...............................90/29 |

Primary Examiner—Andrew R. Juhasz
Assistant Examiner—Z. R. Bilinsky
Attorney—Holman & Stern

[57] ABSTRACT

The manufacture of the stator core frame of a large electrical machine and more particularly turbogenerators in which the stator core frame is set vertically, fastened in such position and then slotted by a machining operation, for example by milling. The stacking ribs are fitted into the slots, after which the frame is unfastened and set horizontally. The stacking ribs are welded into the slots, and the frame is again set vertically and fastened. At least one seating surface of the stacking ribs is finally machined, preferably by milling.

4 Claims, 4 Drawing Figures

METHOD OF MANUFACTURING STATOR CORE FRAME OF ELECTRICAL MACHINE, FOR EXAMPLE, TURBOGENERATOR, AND DEVICE FOR MACHINING SAID FRAME FOR REALIZATION OF SAID METHOD

BACKGROUND OF THE INVENTION

The present invention relates to the pursued manufacturing of large electrical machines, such as turbogenerators, and more specifically to a method of manufacturing the stator core frame and a device for its realization and may be used widely in making electrical machines, for example turbogenerators rated 100 thousand kilowatts and above.

Widely known in the art is a method of manufacturing the stator core frame of large electrical machines and a device for its realization comprising such generally known operations as slotting the core frame, installing the stacking ribs into the slots, welding the ribs to the core frame and machining the seating surfaces of these ribs for subsequent stacking of the core.

The known method possesses a number of serious disadvantages. For instance, the slots in the stator core frame for the stacking ribs are made by gas cutting according to a preliminary layout, and this operation involves the use of many bulky devices. In view of the fact that it is difficult to cut the slots with a high accuracy as to their dimensions and relative spacing around the circumference, a number of checking and fitting operations are required during the installation of the stacking ribs which also requires the use of bulky devices and templets. The known devices cannot ensure machining of the seating surfaces of the stacking ribs for the subsequent stacking of the core, and hence the final finishing of the stacking ribs to ensure the required dimensions has been done manually, using fitter's tools.

Thus, the known method necessitates a great amount of manual labor and time, by the use of a large number of devices and tools and fails to ensure high accuracy of manufacture of the stator core so that during the stacking of the core laminations, individual stacking ribs have to be additionally fitted to the segment.

An object of the present invention resides in eliminating the above and other existing in the art.

SUMMARY OF THE INVENTION

The main object of the invention is to provide a method of and device for manufacturing the stator core frame of the type under consideration which increases the accuracy of the manufacture and reduce the amount of labor required for the manufacture of the stator core frame.

This object is achieved by providing a method of manufacturing the stator core frame of an electrical machine, such as, a turbogenerator, including cutting slots in the core frame, installing stacking ribs into the slots, welding the ribs to the core frame and machining the seating surfaces of the ribs for the subsequent stacking of the core in which, the core frame is set vertically and fixed, then slots are machined in the frame for installing the stacking ribs, after which the core frame is unfastened, set horizontally and the stacking ribs are welded to the core frame, the core frame is again installed vertically, fastened and at least one seating surface of the stacking ribs is finally machined mechanically.

The machining device comprises a baseplate provided with a vertical column outside of which the stator core frame is installed for machining, the baseplate mounts an aligning device installed concentrically with the vertical column, the aligning device fixes the lower part of the stator core frame concentrically with the column, the upper part of the column is provided with a crosspiece fixing the upper part of the core frame concentrically with the column and pressing the core frame against the aligning device; and a platform is located between the crosspiece and the aligning device for moving along the column and supporting the devices for cutting slots in the core frame and machining the stacking ribs.

It is practicable that the device for slotting the stator core frame and machining the stacking ribs be in the form of tool carriers provided with cutter heads movable along the platform, and of a spacing disc also located on the platform and provided with fixing holes whose number should correspond to the number of the stacking ribs of the core frame being machined.

It is likewise practicable that the platform be provided with one or more guide links each being connected with one stacking rib and serving to fix the platform relative to the frame during machining of the stacking ribs.

Moreover, each guide link may be provided with a machined attachment whose cross section corresponds to the profile of the stacking rib and which is installed on one of the non-machined stacking ribs.

In manufacturing turbogenerators rated 100, 200, 300, 500, 800 thousand kilowatts and above, the present inventions increases considerably the machining accuracy of the stator core which, in turn, improves its vibration, strength and electrical characteristics and increases the reliability and service life of the turbogenerators.

The invention have been tested in manufacturing the stator core of a 300,000 kW turbogenerator and reduced approximately fine times the amount of labor required for this work and raised considerably the machining accuracy.

For better understanding of the invention, reference is made to the following detailed description of a preferred embodiment of the to the accompanying drawings, in which:

DETAILED DESCRIPTION OF THE INVENTION

Figure 1:
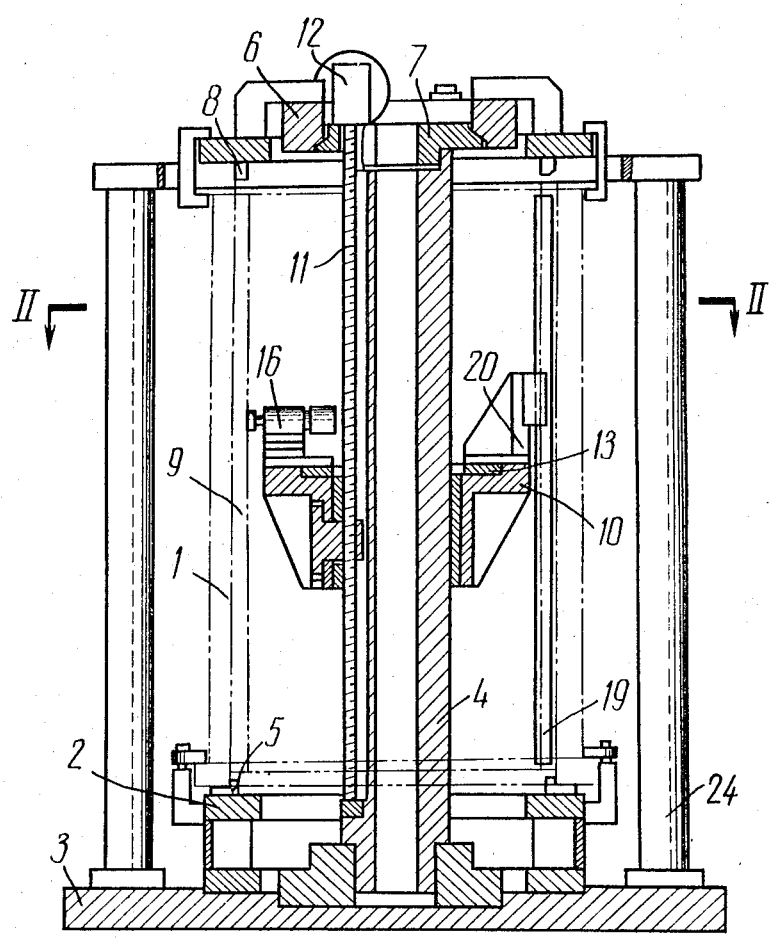
FIG. 1 is a view partly in elevation and partly in cross-section; of a device for machining a stator core frame in accordance with the invention

A frame 1 (FIG. 1) of the stator core (the frame 1 is shown by dotted lines in the figures) is set vertically on an aligning device 2 which is secured on a baseplate 3 and arranged concentrically with respect to a vertical column 4. For fixing the lower part of the frame 1 concentrically with the column 4, the aligning device 2 is provided with aligning retainers 5. When the lower part of the core frame 1 is fixed in position, its upper part is set concentrically with respect to the column 4 and the entire core frame is pressed against the aligning device 2 by a crosspiece 6 which is centered on the column 4 by a conical disc 7 and on the frame 1 by aligning retainers 8 secured on the cross-piece 6. Thus, the crosspiece 6 combines the frame 1, aligning device 2 and column 4 into a rigid integral unit so that the inherently non-rigid core frame acquires rigidity thus yielding itself readily to machining with a high accuracy and surface finish. Upon fixing the stator core frame 1 in the device, the next step is to slot the frame for the accommodation of stacking ribs 9 and the slotting is effected by machining (in this particular case by milling). For this purpose, the device is provided with a platform 10 on the column 4 located between the crosspiece 6 and the aligning device 2. The platform 10 can be moved upwardly and downwardly within the frame 1 by a screw 11. The screw 11 is rotated by a speed reducer 12 installed on the conical disc 7 and positioned in a recess of the platform 10 closer to the column 4 is a spacing disc 13 provided with fixing holes 14 (FIG.2) The remaining portion of the platform 10 has raceways 15.

The number of the fixing holes 14 of the disc 13 is selected to suit the number of the stacking ribs 9 of the stator frame, and hence the disc 13 is of a replaceable type. This means that the disc 13 may be replaced by another similar disc provided with a greater or lesser number of the fixing holes 14 dependent upon the number of the stacking ribs to be provided on the stator core frame.

Figure 2:
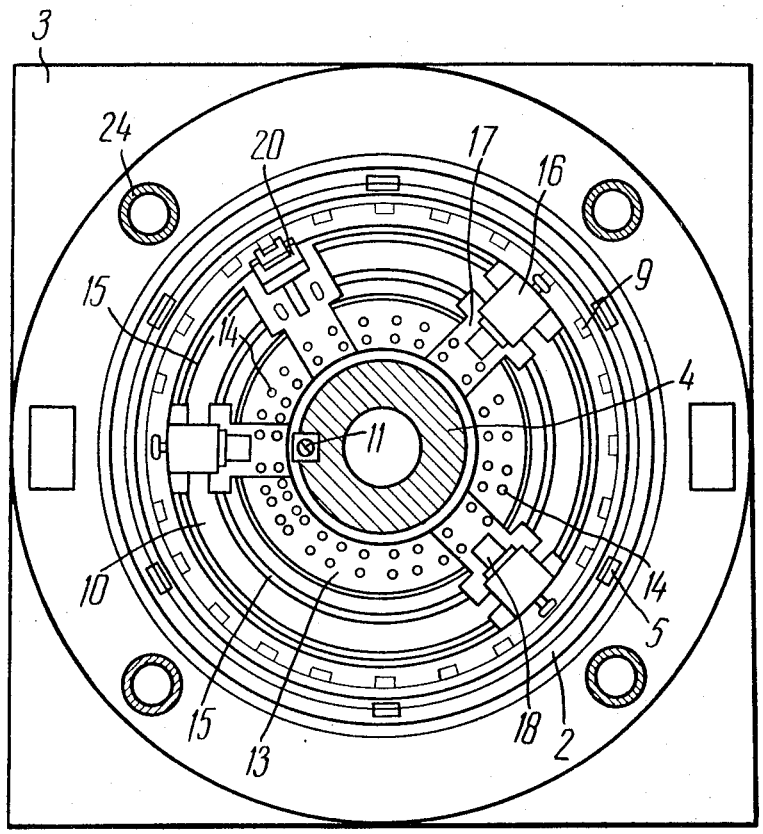
FIG. 2 is a section taken along line II—II of FIG. 1.

The platform 10 also has cutter heads 16 (FIGS. 1, 2) and FIG. 2 shows the device provided with three cutter heads although a greater or lesser number may be employed. Each cutter head 16 is mounted on its own tool carrier 17, which can shift the head in all directions and the cutter heads 16 are provided with individual drives 18.

The slots in the stator core frame 1 are machined as follows:

The speed reducer 12 of the platform 10 and the drives 18 of the cutter heads 16 are started and the slots in the frame are machined by moving the platform 10 upwardly or downwardly along the screw 11.

At first as many slots are machined as there are cutter heads 16 on the platform 10, and the rate of feed of the platform 10 and cutter heads 16 is selected to suit the cutting conditions. For machining the next group of slots, the tool carriers 17 are unfastened and shifted along the raceway 15 of the platform 10 until aligned with the next row of the fixing holes 14 on the spacing disc 13, and are fixed in this position. In the same manner, all of the remaining slots are milled.

Then, the stator is unfastened, placed horizontally on a turn-over device (not shown in the drawings), the stacking ribs 9 are fitted into the machined slots, tacked by electric welding, and then finally welded.

Thereafter, the stator core frame 1 is set vertically and fastened in the device as above described.

Figure 3:
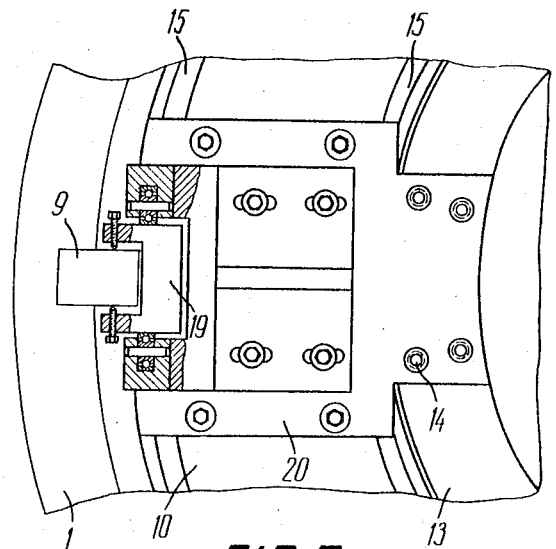
FIG. 3 is a fragmentary view partly in elevation and partly in cross-section of a part of the platform of the device with a guide link installed on a non-machined stacking rib.

An attachment 19 FIG.3) previously machined with a required degree of accuracy is fastened on one of the non-machined stacking ribs 9, and the attachment has a cross section corresponding to the profile of the stacking rib 9. Then, a drive link 20 is installed on the platform 10 for fixing the position of the platform 10 with respect to the frame 1 i.e. for preventing possible tangential displacements of the platform with relation to the frame 1 being machined. The drive link 20 is set by the spacing disc and fastened rigidly on the platform 10, thereby connecting the drive link with the attachment 19. In this example, one drive link 20 is shown on the platform 10 although there may be a greater number. In such a case, the non-machined stacking ribs 9 must have as many attachments 19 as there are drive links 20 on the platform 10.

Figure 4:
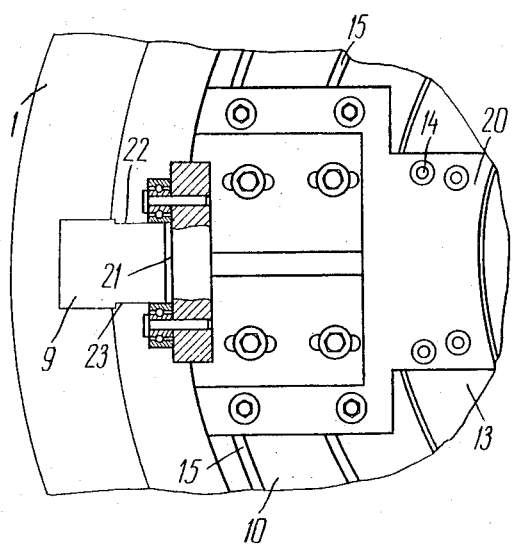
FIG. 4 is a view similar to FIG. 3 of a part of the platform of the device with a guide link installed on the machined stacking rib.

The cutter heads 16 then fixed on the spacing disc 13 are brought close for milling the first group of the stacking ribs 9 whose number corresponds to the number of cutter heads installed on the platform. In the example described herein, three planes 21, 22 and 23 are milled on each machined rib 9 (FIG.4). However, only one surface of the rib may be milled, for instance plane 21, or only two surfaces, for instance 22 and 23 or any other combination of simultaneously milled surfaces, for example and 23 or and 22, dependent upon specific requirements. for milling (FIG.4).

After machining the first group of the stacking ribs 9, the drive link 20 and the cutter heads 16 are unfastened and displaced for milling the next group of the stacking ribs. For this purpose, the attachment 19 is removed and the drive link 20 is connected directly with one of the already machined stacking ribs FIG. 4.

The second of the stacking ribs is machined in the same manner and so on until all of the ribs are machined. Then, the dimensions of the stator core frame are checked, the frame is removed from the device and transferred for stacking the core laminations.

To facilitate the servicing of the device, the baseplate 3 is provided with uprights 24 for supporting the flooring, ladders (not shown in he drawings) and counterweights (not shown) serve for counterbalancing the platform 10.

What we claim is:

1. A device for machining mechanically a stator core frame comprising, a baseplate for mounting thereon the stator core frame being machined, a vertical column installed on said baseplate, the core frame being installed on said baseplate outside of the column; an aligning device on said baseplate for fixing the lower part of said stator core frame concentrically with respect to said vertical column, a platform installed on the vertical column and movable along the column, a crosspiece located above said vertical column fixing the upper part of said stator core frame concentrically with said column and pressing said frame against said aligning device combining thereby the stator core frame aligning device and column into a rigid integral unit whereby the core frame acquires rigidity, and means mounted on said platform for slotting said stator core frame and machining the stacking ribs.

2. A device for machining a stator core frame comprising, a baseplate for mounting the stator core frame being machined, a vertical column installed on said baseplate, the core frame being installed on said baseplate outside of the column, an aligning device on said baseplate for fixing the lower part of stator core frame concentrically with respect to said vertical column, a crosspiece located above said vertical column for fixing the upper part of said stator core frame concentrically with respect to said column and for pressing said frame against said aligning device, a platform located between said crosspiece and the aligning device and movable along the vertical column, and means mounted on said platform for slotting said stator core frame and machining the stacking ribs, the means for cutting slots in the stator core frame and machining the stacking ribs including tool carriers provided with cutter heads movable along the platform, and a spacing disc on said platform, said disc having fixing holes the number of which is selected to suit the number of the stacking ribs of the stator core frame being machined.

3. The device according to claim 1 in which the platform includes at least one drive link connected with one stacking rib being machined and serving for fixing the platform with relation to the stator core frame.

4. The device according to claim 3 in which the drive link is provided with a previously machined attachment having a cross section corresponding to the profile of the stacking ribs and which is installed on one of the non-machined ribs.

* * * * *